(12) United States Patent
Ito (10) Patent No.: US 9,669,837 B2
(45) Date of Patent: Jun. 6, 2017

(54) HYBRID VEHICLE INCLUDING CONTROL DEVICE THAT RELEASES CLUTCH WHEN RESONANCE OCCURS IN ROTATIONAL SHAFTS

(71) Applicant: Toyota Jidosha Kabushiki Kaisha, Toyota-shi, Aichi-ken (JP)

(72) Inventor: Kohei Ito, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/093,352

(22) Filed: Apr. 7, 2016

(65) Prior Publication Data

US 2016/0297448 A1    Oct. 13, 2016

(30) Foreign Application Priority Data

Apr. 10, 2015    (JP) .................. 2015-080736

(51) Int. Cl.
| | |
|---|---|
| *B60W 30/20* | (2006.01) |
| *B60K 6/40* | (2007.10) |
| *B60K 6/387* | (2007.10) |
| *B60W 10/02* | (2006.01) |
| *B60W 20/00* | (2016.01) |

(52) U.S. Cl.
CPC ............. *B60W 30/20* (2013.01); *B60K 6/387* (2013.01); *B60K 6/40* (2013.01); *B60W 10/02* (2013.01); *B60W 10/026* (2013.01); *B60W 20/00* (2013.01); *B60W 2510/0208* (2013.01); *B60W 2510/0233* (2013.01); *B60W 2710/021* (2013.01); *B60W 2710/024* (2013.01); *B60Y 2200/92* (2013.01); *B60Y 2300/188* (2013.01); *B60Y 2300/421* (2013.01); *B60Y 2300/429* (2013.01); *B60Y 2400/42* (2013.01); *B60Y 2400/426* (2013.01); *Y10S 903/946* (2013.01)

(58) Field of Classification Search
CPC .... B60W 30/20; B60W 10/026; B60W 20/00; B60K 6/387; B60K 6/40
See application file for complete search history.

(56) References Cited

U.S. PATENT DOCUMENTS

2007/0102211 A1* 5/2007 Nozaki .................... B60K 6/48
                                                        180/65.7
2010/0185351 A1* 7/2010 Uchiyama ............. B60K 6/445
                                                        701/22

FOREIGN PATENT DOCUMENTS

JP    2007-131070 A    5/2007
JP    2009-040174 A    2/2009

* cited by examiner

*Primary Examiner* — John Walters
*Assistant Examiner* — James Triggs
(74) *Attorney, Agent, or Firm* — Dinsmore & Shohl LLP (57) ABSTRACT

An ECU executes control processing including the step of extracting amplitudes f1, f2 of a resonant zone when a traveling mode is in a hybrid traveling mode, the step of executing count processing, the step of starting a first resonance avoidance control when a first count value Nf1 is greater than a threshold value n(1), the step of starting a second resonance avoidance control when a second count value Nf2 is greater than a threshold value n(2), the step of releasing a clutch K2 when resonance continues even after elapse of a predetermined time period Tb from starting of the second resonance avoidance control, and the step of terminating the resonance avoidance control when predetermined time period Ta has elapsed from determination of occurrence of resonance.

7 Claims, 6 Drawing Sheets

HYBRID VEHICLE INCLUDING CONTROL DEVICE THAT RELEASES CLUTCH WHEN RESONANCE OCCURS IN ROTATIONAL SHAFTS

This nonprovisional application is based on Japanese Patent Application No. 2015-080736 filed on Apr. 10, 2015 with the Japan Patent Office, the entire contents of which are hereby incorporated by reference.

BACKGROUND OF THE INVENTION

Field of the Invention

The present invention relates to a control of a hybrid vehicle having a first rotational shaft connected at its one end to an output shaft of an engine via a first clutch and a second rotational shaft connecting the other end of the first rotational shaft to a transmission, wherein a driving electric motor is connected to the second rotational shaft via a second clutch.

Description of the Background Art

There has been a generally known hybrid vehicle having an engine and a driving electric motor as driving sources and traveling with a driving force transmitted to driving wheels through a power transmission passage via a transmission. For example, when such a hybrid vehicle travels on a road surface including irregularities such as a wave road, there is a case where repeated slipping and gripping of driving wheels cause cyclical torque fluctuations to be transmitted back from the driving wheels to the driving sources.

Particularly, in a case where a clutch having therein a torque limiter damper is provided a transmission and a driving source, receiving torque fluctuations exceeding torque which is allowable in the torque limiter damper may cause a contact between a member, which is movable in a twist direction of the torque limiter damper, and its stopper, thereby resonance occurs in the rotational shaft between the transmission and the driving source. Accordingly, great torque may be given by the rotational shaft.

With regard to such a problem, for example, Japanese Patent Laying-Open No. 2009-040174 discloses technique of lowering an output of an engine when a detection result by a detection device for detecting irregularities on a road surface causes cyclical torque fluctuations in an output shaft.

SUMMARY OF THE INVENTION

In a hybrid vehicle capable of blocking transmission of power from an engine, there is a case where resonance cannot be suppressed by lowering an output of an engine. Therefore, suppression of resonance not dependent on changes in output of an engine is demanded.

An object of the present invention is to provide a hybrid vehicle which suppresses occurrence of resonance in a rotational shaft between a driving source and a transmission:

A hybrid vehicle according to one aspect of the present invention includes an engine, a first rotational shaft having one end connected to an output shaft of the engine via a first clutch, a torque converter including a lock-up clutch and having an Output shaft connected to driving wheels via a transmission, a second rotational shaft connecting the other end of the first rotational shaft and an input shaft of the torque converter, a driving electric motor connected to the second rotational shaft via a second clutch, and a control device configured to control operation of the first clutch, the second clutch, and the lock-up clutch. The control device releases any one of the first clutch and the second clutch when resonance occurs in the first rotational shaft, and releases the lock-up clutch when resonance occurs in the second rotational shaft.

With such a configuration, when resonance occurs in the first rotational shaft, any one of the first clutch and the second clutch is released, so that the resonance characteristic (resonance frequency) of the first rotational shaft can be changed. Therefore, occurrence of resonance in the first rotational shaft can be suppressed. Further, when resonance occurs in the second rotational shaft, the lock-up clutch is released, so that the resonance characteristic can be changed while transmitting power of the engine or the driving electric motor. Therefore, torque fluctuations transmitted from the driving wheels can be alleviated by the torque converter. Accordingly, occurrence of resonance in the second rotational shaft can be suppressed.

Preferably, the control device releases one of the first clutch and the second clutch that has a smaller change in a driving force due to release when resonance occurs in the first rotational shaft.

With such a configuration, the resonance characteristic of the first rotational shaft can be changed while suppressing a change in the driving force, so that generation of resonance in the first rotational shaft can be suppressed.

More preferably, so as to suppress a change in the driving force caused by one clutch being in a released state, the control device increases an output of a driving source connected to the other clutch.

With such a configuration, favorable drivability can be maintained by suppressing the change in the driving force.

More preferably, during traveling of the vehicle with operation of the engine and the driving electric motor, when the lock-up clutch is released due to occurrence of resonance in the second rotational shaft and when the resonance is not suppressed, the control device releases the second clutch.

With such a configuration, when resonance in the second rotational shaft is not suppressed, the resonance characteristic of the second rotational shaft can be further changed by releasing the second clutch in addition to the lock-up clutch. Therefore, occurrence of resonance in the second rotational shaft can be suppressed.

More preferably, during traveling of the vehicle with operation of the driving electric motor in a state where the engine is stopped, when the lock-up clutch is released due to generation of resonance in the second rotational shaft and when the resonance is not suppressed, the control device performs engagement of the first clutch, starting of the engine, and releasing of the second clutch.

With such a configuration, the resonance characteristic of the second rotational shaft can be changed by releasing the second clutch in addition to the lock-up clutch and engaging the first clutch. Therefore, occurrence of resonance in the second rotational shaft can be suppressed. Further, by engaging the first clutch to start the engine, a change in the driving force due to the release of the second clutch can be suppressed.

More preferably, the control device increases an output of the engine so as to suppress a change in a driving force due to the release of the second clutch.

With such a configuration, favorable drivability can be maintained by suppressing the change in the driving force.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings. In the following description, same parts have the same reference characters allotted. Names and functions of those are also the same. Thus, detailed description thereof will not be repeated.

Figure 1:
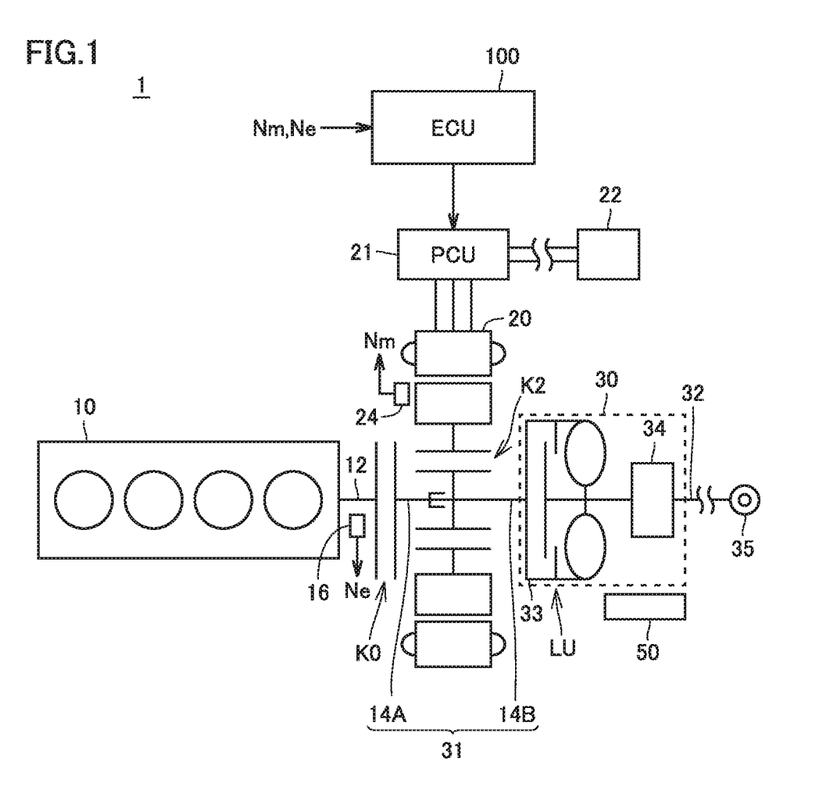
FIG. 1 is a block diagram representing an entire configuration of a vehicle in accordance with the present embodiment.

FIG. 1 is an entire configuration diagram representing a vehicle 1 in accordance with the present embodiment. Vehicle 1 includes an engine 10, a motor generator (hereinafter, also referred to as "MG") 20, an electric power controlling circuit (hereinafter, referred to as "PCU (Power Control Unit)") 21, a high voltage battery 22, an automatic transmission unit 30, a clutch K2, a clutch K0, a hydraulic circuit 50, and an electronic control unit (hereinafter, referred to as "ECU") 100.

Vehicle 1 is a hybrid vehicle which travels by transmitting power of at least one of engine 10 and MG 20 to driving wheels via automatic transmission unit 30. Engine 10 is a combustion engine such as a gasoline engine or a diesel engine. An input shaft 31 of automatic transmission unit 30 is coupled to an output shaft 12 of engine 10 through clutch K0. An output shaft 32 of automatic transmission unit 30 is coupled to driving wheels 35. Automatic transmission unit 30 in accordance with the present embodiment includes a torque converter 33 and an automatic transmission 34.

Torque converter 33 is provided with a lock-up clutch LU. When lock-up clutch LU is in an engaged state, the input shall and the output shaft of torque converter 33 are in a direct coupling state, so that power is directly transmitted between the input shaft and the output shaft. When lock-up clutch LU is in a released state, the direct coupling state is cancelled, so that transmission of power between the input shaft and the output shaft is performed via components (for example, a pump impeller, a turbine impeller, and a stator) of torque converter 33.

Automatic transmission 34 may be a stepped automatic transmission or a stepless automatic transmission.

MG 20 is configured representatively with a synchronous motor of a three phase permanent magnet type. In other words, a permanent magnet is mounted on a rotor of MG 20. In the stator of MG 20, a three phase coil (a U-phase coil, a V-phase coil, a W-phase coil) is wound, and the other ends of each phase coil are connected to each other at a neutral point. The rotor of MG 20 is hollow, and input shaft 31 penetrates therethrough.

In the present embodiment, input shaft 31 includes a first rotational shaft 14A and a second rotational shaft 14B which is separated from first rotational shaft 14A. The other end of first rotational shaft 14A is connected to clutch K0. The other end of first rotational shaft 14A is connected to one end of second rotational shaft 14B. The other end of first rotational shaft 14A and the other end of second rotational shaft 14B are connected, for example, by spline fitting. The other end of second rotational shaft 14B is connected to torque converter 33. Clutch K2 is provided between an inner side of the rotor of MG 20 and second rotational shaft 14B. In other words, the rotor of MG 20 is connected to second rotational shaft 14B through clutch K2.

MG 20 is driven by high voltage electric power supplied from high voltage battery 22 through PCU 21. Moreover, MG 20 generates power by being rotated by power transmitted from input shaft 31 of automatic transmission unit 30 (power transmitted engine 10 or driving wheels). High voltage battery 22 stores electric power for supply to MG 20 operated with a high voltage.

PCU 21 includes a converter and an inverter. The converter raises the voltage inputted from high voltage battery 22 and outputs the same to the inverter, or it lowers the voltage inputted from the inverter and outputs the same to high voltage battery 22. The inverter converts a direct current inputted from the converter into a three-phase alternating current and outputs the same to MG 20, or it converts a three-phase alternating current inputted from MG 20 into a direct current and outputs the same to the converter.

Hydraulic circuit 50 regulates an hydraulic pressure supplied from an electric oil pump or a mechanical oil pump, neither illustrated, and supplies the same to automatic transmission unit 30, clutch K2, and clutch K0.

Clutch K2 in accordance with the present embodiment is a clutch of so-called normally close (hereinafter, also referred to as "N/C") type, where clutch K2 is engaged in a regular state (normal state) where the hydraulic pressure is not supplied, and released in a state where the hydraulic pressure of greater than or equal to a predetermined release hydraulic pressureP1 is supplied. Similarly, clutch K0 in accordance with the present embodiment is a clutch of the N/C type, where clutch K0 is engaged in the normal state and released in the state where the hydraulic pressure of greater than or equal to a predetermined release hydraulic pressureP2 is supplied.

In the present embodiment, torque limiter dampers (not shown) are provided in clutch K0 and clutch K2. The torque limiter damper of clutch K0 absorbs twist torque between the rotational shaft on the side of engine 10 and the rotational shaft on the side of automatic transmission unit 30 in clutch K0 in the case where clutch K0 is in the engaged state with use of an elastic member or the like to alleviate torque fluctuations. The torque limiter damper of clutch K2 absorbs twist torque between the rotational shaft on the side of MG 20 and the rotational shaft on the side of automatic transmission unit 30 in clutch K2 in the case where clutch K2 is in the engaged state with use of an elastic member or the like to alleviate torque fluctuations. The torque limiter damper includes a member which is movable in the twist direction and a stopper which limits the amount of shift of the movable member in the twist direction.

Vehicle 1 is provided with a plurality of sensors (none of them is shown) for detecting physical amounts such as an operation amount with respect to an accelerator pedal by a user, a rotating speed (engine rotation number Ne), a rotating speed (motor rotation number Nm), and the like which are necessary for controlling vehicle 1. These sensors transmit detection results to ECU 100.

ECU 100 is configured to include a CPU (Central Processing Unit) and an internal memory, which are not shown in the drawings. ECU 100 executes a predetermined arithmetic processing based on information from each sensor and information stored in the memory, and controls each equipment of vehicle 1 based on the calculation result.

Specifically, signals indicating detection results from a resolver 24 for detecting motor rotation number Nm of MG 20 and an engine rotation number sensor 16 for detecting engine rotation number Ne are inputted to ECU 100.

ECU 100 allows vehicle 1 to travel in accordance with any of traveling modes among the motor traveling mode, the hybrid traveling mode, and the engine traveling mode. When the SOC (State Of Charge) of high voltage battery 22 is high enough, and at the time of forward traveling, the motor traveling mode is selected at a low vehicle speed (for example, lower than or equal to 30 km/h), and the hybrid traveling mode or engine traveling mode is selected at a high vehicle speed (for example, higher than or equal to 30 km/h). On the other hand, when the SOC of high voltage battery 22 is low, the hybrid traveling mode or engine traveling mode is selected regardless of the vehicle speed.

When the motor traveling mode is selected, ECU 100 engages clutch K2 (coupling MG 20 to input shaft 31 of automatic transmission unit 30) and releases clutch K0 (separating engine 10 from input shaft 31 of automatic transmission unit 30) to control vehicle 1 so as to rotate input shaft 31 of automatic transmission unit 30 with power of MG 20.

When the hybrid traveling mode is selected, ECU 100 engages clutch K2 (coupling MG 20 to input shaft 31 of automatic transmission unit 30) and engages clutch K0 (coupling engine 10 to input shaft 31 of automatic transmission unit 30) to control vehicle 1 so as to rotate input shalt 31 of automatic transmission unit 30 with power of at least one of engine 10 and MG 20.

When the engine travel mode is selected, ECU 100 releases clutch K2 (separating MG 20 from input shaft 31 of automatic transmission unit 30) and engages clutch K0 (coupling engine 10 to input shaft 31 of automatic transmission unit 30) to control vehicle 1 so as to rotate input shaft 31 of automatic transmission unit 30 with power of engine 10. It should be noted that since MG 20 is separated from the power train, it has a configuration which is similar to a vehicle having only an engine which includes an automatic transmission between engine 10 and driving wheels 35 as a driving source.

In vehicle 1 having the configuration described above, when vehicle 1 travels on a road surface having irregularities such as a wave road, there is a case where repeated slipping and gripping of driving wheels 35 causes cyclical torque fluctuations to be transmitted back from the driving wheels to the driving source. Particularly, there is a case where receiving torque fluctuations exceeding torque which is allowable in the torque limiter damper may cause a contact between the movable member and the stopper, so that resonance may occur in input shaft 31. Accordingly, there is a case where great torque is given to input shaft 31.

Figure 2:
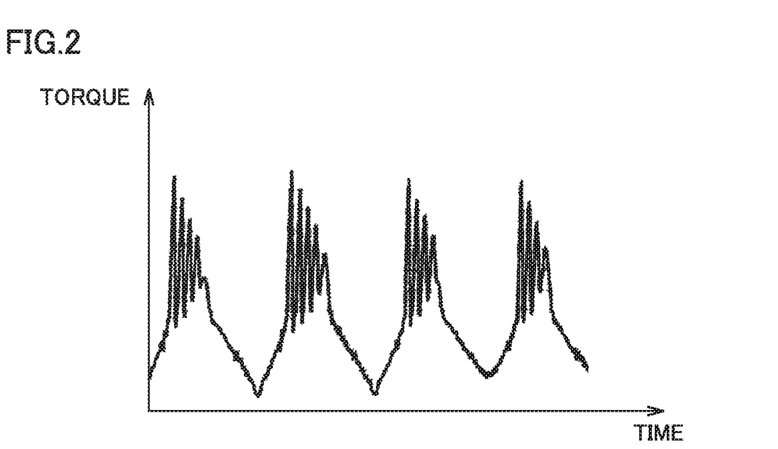
FIG. 2 represents torque fluctuations received by an input shaft during traveling on a wave road.

When vehicle 1 travels on a wave road, and a contact between the movable member and the stopper may occur in the torque limiter damper, the resonance phenomenon as shown in FIG. 2 may occur. The vertical axis in FIG. 2 denotes a change in torque received by input shaft 31, and the horizontal axis in FIG. 2 denotes time. When vehicle 1 travels on a wave road, there is a case where slipping and gripping are repeated at driving wheels 35. In this case, torque received at input shaft 31 increases from the timing at which driving wheels 35 are changed from the slipping state to the gripping state. When torque which is greater than torque which is allowable in the torque limiter damper is received, a contact between the movable member and the stopper may occur. The resonance occurs in the state where the contact between the movable member and the stopper member occurs, so that greater torque is given to input shaft 31.

With respect to such torque fluctuations, it can be contemplated to control engine torque to avoid an input of torque caused by resonance. However, since the traveling mode of vehicle 1 may have the traveling mode of separating clutch K0, there is a case where the resonance cannot be necessarily suppressed by the suppression of the engine torque.

Therefore, in the present embodiment, ECU 100 releases any one of clutch K0 and clutch K2 when the resonance occurs in first rotational shaft 14A, and it releases lock-up clutch LU when the resonance occurs in second rotational shaft 14B.

With such a configuration, when resonance occurs in first rotational shaft 14A, any one of clutch K0 and clutch K2 is released, so that the resonance characteristic (resonance frequency) of first rotational shaft 14A can be changed. Therefore, occurrence of the resonance in first rotational shaft 14A can be suppressed. Further, when the resonance occurs in second rotational shaft 14B, lock-up clutch LU is released, so that the resonance characteristic can be changed, and the torque fluctuations transmitted from driving wheels 35 can be alleviated by torque converter 33. Therefore, occurrence of the resonance in second rotational shaft 149 can be suppressed.

Figure 3:
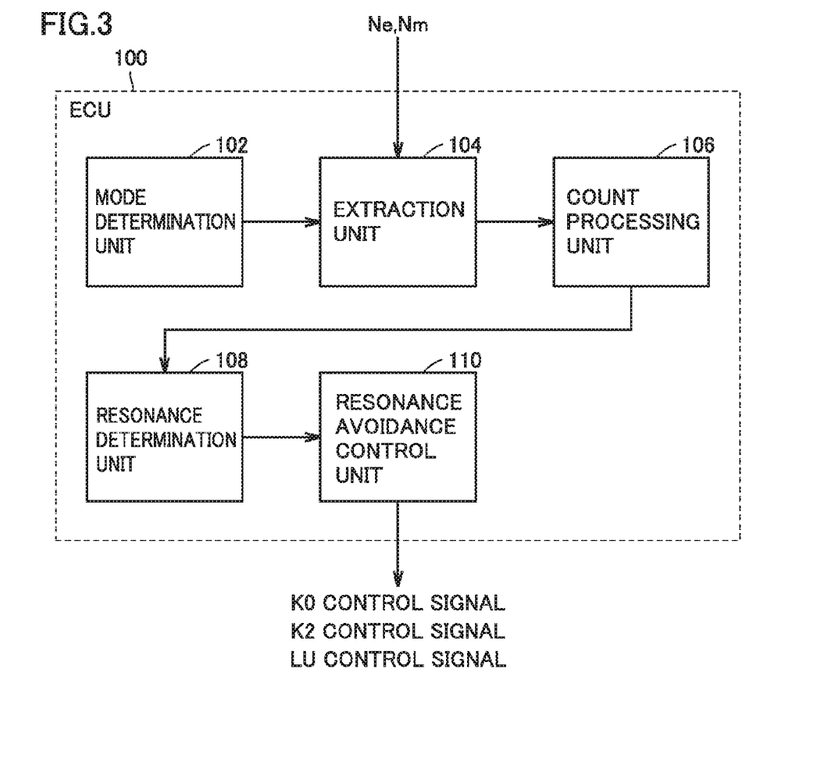
FIG. 3 is a function block diagram of an ECU.

FIG. 3 shows a function block diagram of ECU 100 mounted on vehicle 1 in accordance with the present embodiment. ECU 100 includes a mode determination unit 102, an extraction unit 104, a count processing unit 106, a resonance determination unit 108, and a resonance avoidance control unit 110. It should be noted that these configurations may be achieved by software such as a program or may be achieved by hardware.

Mode determination unit 102 determines if the traveling mode is the motor traveling mode or the hybrid traveling mode. Mode determination unit 102 determines if the traveling mode currently being selected is the motor traveling mode or the hybrid traveling mode based on, for example, a state on-state or off-state) of a flag (mode determination flag) which is changed every time when the traveling mode is switched.

It should be noted that mode determination unit 102 may determine that the traveling mode is the motor traveling mode, for example, when clutch K0 is in the released state and clutch K2 is in the engaged state. Alternatively, mode determination unit 102 may determine that the traveling mode is the hybrid traveling mode when clutch K0 is in the engaged state and clutch K2 is in the engaged state.

When the traveling mode is the hybrid traveling mode, extraction unit 104 extracts with use of a band pass filter or the like an amplitude f1 of a resonant zone a natural vibration frequency of first rotational shaft 14A) in rotational fluctuations of first rotational shaft 14A based on engine rotation number Ne detected by engine rotation number sensor 16, and extracts with use of a band pass filter or the like an amplitude f2 of a resonant zone (a natural vibration frequency of second rotational shaft 14B) in rotational fluctuations of second rotational shaft 149 based on an engine speed of MG 20 detected by resolver 24. It should be noted that natural vibration frequencies (primary natural vibration frequencies in torsion oscillation of first rotational shaft 14A and second rotational shaft 14B are calculated in design based on a shaft diameter, weight, and the like. It should be noted that the band pass filter may be the one of known arts, and detailed description will not be made.

On the other hand, when the traveling mode is the motor traveling mode, extraction unit 104 extracts with use of a band pass filter and the like only amplitude f2 of the resonant zone (a natural vibration frequency of second rotational shaft 14B) in rotational fluctuations of second rotational shaft 14B based on motor rotation number Nm of MG 20 detected by resolver 24.

Count processing unit 106 increases a first count value Nf1 by one when amplitude f2 extracted by extraction unit 104 is greater than a first amplitude threshold value x1. It should be noted that count processing unit 106 resets first count value Nf1 to an initial value (for example, zero) after it is determined by a resonance determination unit 108 described later that resonance occurs in first rotational shaft 14A and a flag F1 is set to be the on-state.

Moreover, count processing unit 106 increases second count value Nf2 by one when amplitude f2 extracted by extraction unit 104 is greater than a second amplitude threshold value x2. It should be noted that count processing unit 106 resets second count value Nf2 to an initial value (for example, zero) after it is determined by resonance determination unit 108 described later that resonance occurs in second rotational shall 14B and a flag F2 is set to be the on-state. It should be noted that first amplitude threshold value x1 and second amplitude threshold value x2 are predetermined values, and are adopted based on experiments and the like.

In the following description, the processing of increasing first count value Nf1 or second count value Nf2 will be described as count processing.

Resonance determination unit 108 determines that resonance occurs in first rotational shaft 14A when first count value Nf1 calculated by count processing unit 106 is greater than a predetermined number n(1). Resonance determination unit 108 sets flag F1 to be the on-state when it determines that resonance occurs in first rotational shaft 14A.

On the other hand, resonance determination unit 108 determines that resonance occurs in second rotational shaft 14B when second count value Nf2 calculated by count processing unit 106 is greater than a predetermined number n(2). Resonance determination unit 108 sets flag F2 to be the on-state when it determines that resonance occurs in second rotational shaft 14B.

It should be noted that resonance determination unit 108 resets a value of a timer to be an initial value (for example, zero) and activates the timer when either flag F1 or flag F2 is set to be the on-state. When the timer is activated, as a predetermined time period (for example, 1 second) passes, a value corresponding to the predetermined time period is added to a value of the timer. Accordingly, an elapsed time from determination of generation of resonance is measured.

Resonance avoidance control unit 110 executes a resonance avoidance control in accordance with a traveling mode and a resonance-occurring part (in other words, in accordance with a mode determination flag, flag F1, flag F2, and a state of flag F3 which will be described later).

Figure 4:
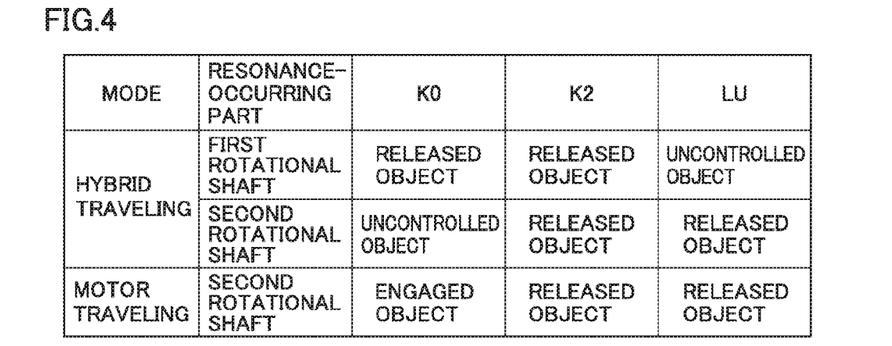
FIG. 4 represents a released object, an engaged object, and an uncontrolled object of the clutch in accordance with traveling modes and parts having resonance generated.

Specifically, when the traveling mode is the hybrid traveling mode, and first rotational shaft 14A is the resonance-occurring part (in other words, the mode determination flag indicates the hybrid traveling mode, and flag F1 is in the on-state, and flag F2 is in the on-gate), resonance avoidance control unit 110, as shown in FIG. 4, executes a first resonance avoidance control of setting clutch K0 and clutch K2 as released objects and setting lock-up clutch LU as an uncontrolled object.

Resonance avoidance control unit 110 compares engine torque with MG torque in the first resonance avoidance control. Resonance avoidance control unit 110 calculates engine torque with a control command value of engine 10 (for example, throttle opening, fuel injection amount, and the like). Moreover, resonance avoidance control unit 110 calculates MG torque based on a torque command value with respect to MG 20.

When the MG torque is greater than the engine torque, resonance avoidance control unit 110 controls a hydraulic pressure supplied to clutch K0 such that clutch K0 is set to be in a released state and controls MG 20 so as to increase the MG torque. Resonance avoidance control unit 110 increases the MG torque such that a change in a driving force of vehicle 1 generated by the release of clutch K0 is suppressed. Resonance avoidance control unit 110 increases the MG torque so as to compensate for the reduction in the driving force due to clutch K0 based on a control command value of engine 10 provided before the release of clutch K0.

On the other hand, when the engine torque is greater than the MG torque, resonance avoidance control unit 110 controls a hydraulic pressure supplied to clutch K2 such that clutch K2 is set to be in the released state and control engine 10 to increase the engine torque. Resonance avoidance control unit 110 increases the engine torque such that a change in a driving force of vehicle 1 generated due to the release of clutch K2 is suppressed. Resonance avoidance control unit 110 increases the engine torque so as to compensate of the driving force generated due to the release of clutch K2 based on a torque command value with respect to MG 20 provided before the release of clutch K2.

Moreover, when the traveling mode is the hybrid traveling mode, and the second rotational shaft 14B is the resonance-occurring part (in other words, the mode determination flag indicates the hybrid traveling mode, and flag F1 is in the off-state, and flag F2 is in the on-state), resonance avoidance control unit 110 executes a second resonance avoidance control of setting clutch K2 and lock-up clutch LU as released objects and setting clutch K0 as an uncontrolled object.

In the second resonance avoidance control, resonance avoidance control unit 110 controls a hydraulic pressure supplied to lock-up clutch LU such that lock-up clutch LU is set to be in the released state. When resonance is not cancelled until an elapse of a predetermined time period Tb from the time of releasing lock-up clutch LU, in other words, when second count value Nf2 becomes greater than predetermined number n(2) again, resonance avoidance control unit 110 sets flag F2 to be in the off-state, and sets flag F3 to be in the on-state. When the mode determination flag indicates the hybrid traveling mode, and both flag F1 and flag F2 are in the off-state, and flag F3 is in the on-state, resonance avoidance control unit 110 controls a hydraulic pressure supplied to clutch K2 such that clutch K2 is set to be in a released state, and controls engine 10 so as to increase the engine torque. Resonance avoidance control unit 110 increases the engine torque so as to suppress a change in the driving force of vehicle 1 generated due to execution of the second resonance avoidance control.

When the traveling mode is the motor traveling mode, and second rotational shaft 14B is the resonance-occurring part (the mode determination flag indicates the motor traveling mode, and flag F1 is in the off-state, and flag F2 is in the on-state), resonance avoidance control unit 110 executes a third resonance avoidance control of setting clutch K0 as an engaged object and setting clutch K2 and lock-up clutch LU as released objects.

In the third resonance avoidance control, resonance avoidance control unit 110 controls a hydraulic pressure supplied to lock-up clutch LU such that lock-up clutch LU is set to be in a released state. When resonance is not cancelled until a predetermined time period Tb is elapsed from the time of releasing lock-up clutch LU, in other words, when second count value Nf2 becomes greater than a predetermined number n(2) again, resonance avoidance control unit 110 sets flag F2 to be in the off-state, and sets flag F3 to be in the on-state. When the mode determination flag indicates the motor traveling mode, and both flag F1 and flag F2 are in the off-state, and flag F3 is in the on-state, resonance avoidance control unit 110 controls a hydraulic pressure supplied to clutch K2 such that clutch K2 is set to be in the released state after controlling a hydraulic pressure supplied to clutch K0 such that clutch K0 is set to be in the engaged state and starting engine 10. Resonance avoidance control unit 110 controls engine torque so as to suppress a change in the driving force of vehicle 1 generated due to execution of the third resonance avoidance control.

When the value of the timer becomes a value corresponding to a predetermined time period Ta of terminating measurement, resonance avoidance control unit 110 sets all of flags F1 to F3 to be in the off-state. It should be noted that predetermined time period Ta is a time period which is longer than at least predetermined time Tb, and which is for example several tens of seconds.

Figure 5:
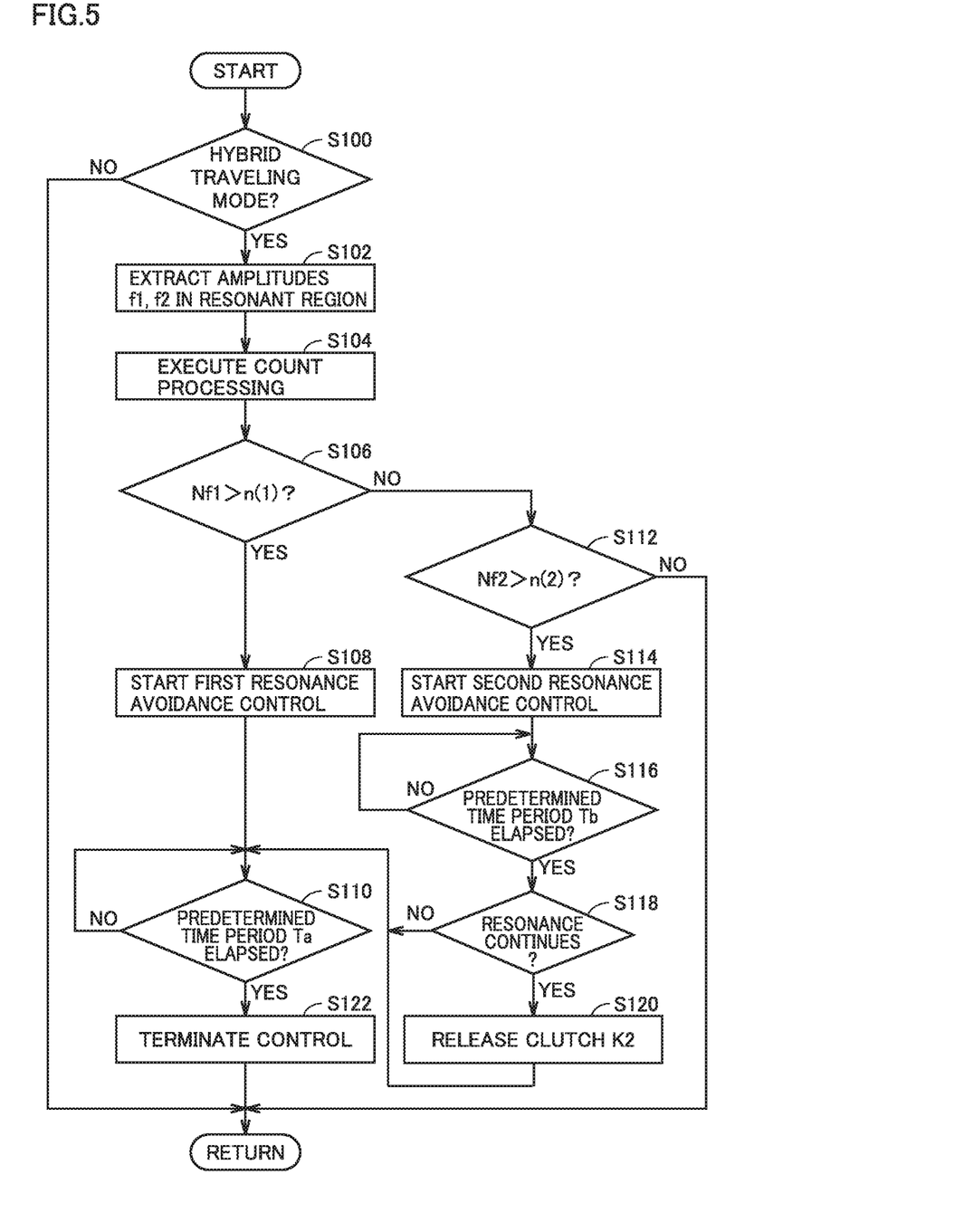
FIG. 5 is a flowchart representing control processing executed by an ECU when a hybrid traveling mode is selected.

Referring to FIG. 5, control processing of the resonance avoidance control executed at the time of selection of the hybrid traveling mode in ECU 100 mounted on vehicle 1 according to the present embodiment will be described.

In step (hereinafter, step is described as "S") 100, ECU 100 determines whether or not the traveling mode is the hybrid traveling mode. When it is determined that the traveling mode is the hybrid traveling mode (YES in S100), the processing proceeds to S102. If not so (NO in S100), this processing is terminated.

In S102, ECU 100 extracts amplitudes f1, f2 in the resonant zone from engine rotation number Ne and motor rotation number Nm. In S104, ECU 100 executes count processing. Since the count processing is as described above, detailed description thereof will not be repeated.

In S106, ECU 100 determines whether or not first count value Nf1 is greater than threshold value n(1). When it is determined that first count value Nf1 is greater than threshold value n(1) (YES in S106), the processing proceeds to S108. If not so (NO in S106), the processing proceeds to S110.

In S108, ECU 100 starts the first resonance avoidance control. In other words, ECU 100 releases a clutch having a smaller change in the driving force between clutch K0 and clutch K1. In S110, ECU 100 determines whether or not predetermined time period Ta has elapsed from determination of occurrence of resonance. When it is determined that predetermined time period Ta has elapsed (YES in S110), the processing proceeds to S122. If not so (NO in S110), the processing returns to S110.

In S112, ECU 100 determines whether or not second count value Nf2 is greater than threshold value n(2). When it is determined that second count value Nf2 is greater than threshold value n(2) (YES in S112), the processing proceeds to S114. If not so (NO in S112), this processing is terminated.

In S114, ECU 100 starts the second resonance avoidance control. In other words, ECU 100 releases lock-up clutch LU. In S116, ECU 100 determines whether or not predetermined time period Tb elapses from starting the second resonance avoidance control. When it is determined that predetermined time period Tb elapses (YES in S116), the processing proceeds to S118. If not so (NO in S116), this processing returns to S116.

In S118, ECU 100 determines whether or not resonance occurs continuously. In other words, when second count value Nf2 is greater than threshold value n(2), it is determined that resonance occurs continuously. When it is determined that resonance occurs continuously (YES in S118), the processing proceeds to S120. If not so (NO in S118), the processing proceeds to S122.

In S120, ECU 100 releases clutch K2 and thereafter allows the processing to proceed to S110. In S122, ECU 100 terminates the control.

Figure 6:
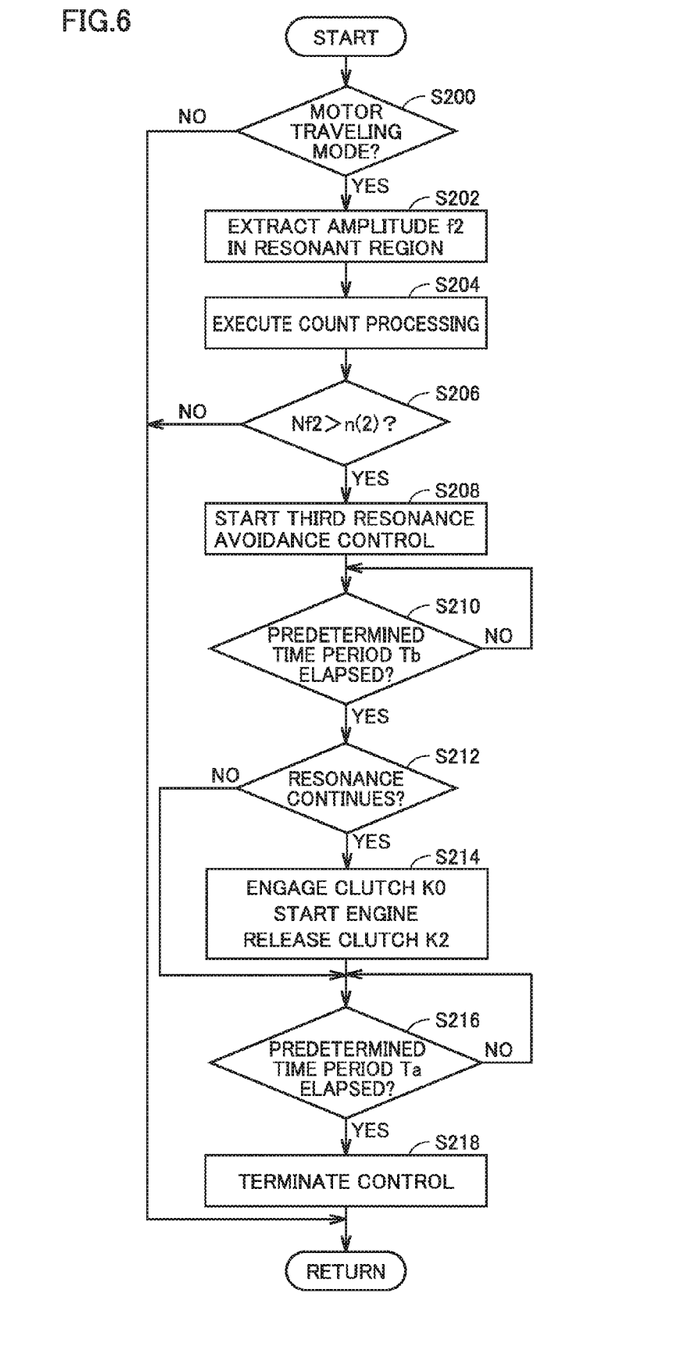
FIG. 6 is a flowchart representing control processing executed by the ECU when a motor traveling mode is selected.

Next, referring to FIG. 6, control processing of the resonance avoidance control executed at the time of selection of the motor traveling mode in ECU 100 mounted on vehicle 1 according to the present embodiment will be described.

In S200, ECU 100 determines whether or not the traveling mode is the motor traveling mode. When it is determined that the traveling mode is the motor traveling mode (YES in S200), the processing proceeds to S202. If not so (NO in S200), this processing is terminated.

In S202, ECU 100 extracts amplitude f2 in the resonant zone from motor rotation number Nm. In S204, ECU 100 executes the count processing. In S206, ECU 100 determines whether or not second count value Nf2 is greater than threshold value n(2). When it is determined that second count value Nf2 is greater than threshold value n(2) (YES in S206), the processing proceeds to S208. If not so (NO in S206), this processing is terminated.

In S208, ECU 100 starts the third resonance avoidance control. In other words, ECU 100 releases lock-up clutch LU. In S210, it is determined whether or not predetermined time period Tb elapses from starting the third resonance avoidance control. When it is determined that predetermined time period Tb elapses (YES in S210), the processing proceeds to S212. If not so (NO in S210), the processing proceeds to S210.

In S212, ECU 100 determines whether or not resonance occurs continuously. When it is determined that resonance occurs continuously (YES in S212), the processing proceeds to S214. If not so (NO in S212), the processing proceeds to S216.

In S214, ECU 100 engages clutch K0, starts engine 10, releases clutch K2, and thereafter allows the processing to proceed to S216. In S216, ECU 100 determines whether or not predetermined time period elapses from the determination of occurrence of resonance. When it is determined that predetermined time period Ta elapses (YES in S216), the processing proceeds to S218. If not so (NO in S216), the processing returns to S216. In S218, ECU 100 terminates the control.

Operation of ECU 100 mounted on vehicle 1 according to the present embodiment based on the structure and flowcharts described above will be described with reference to FIGS. 7 and 8.

Figure 7:
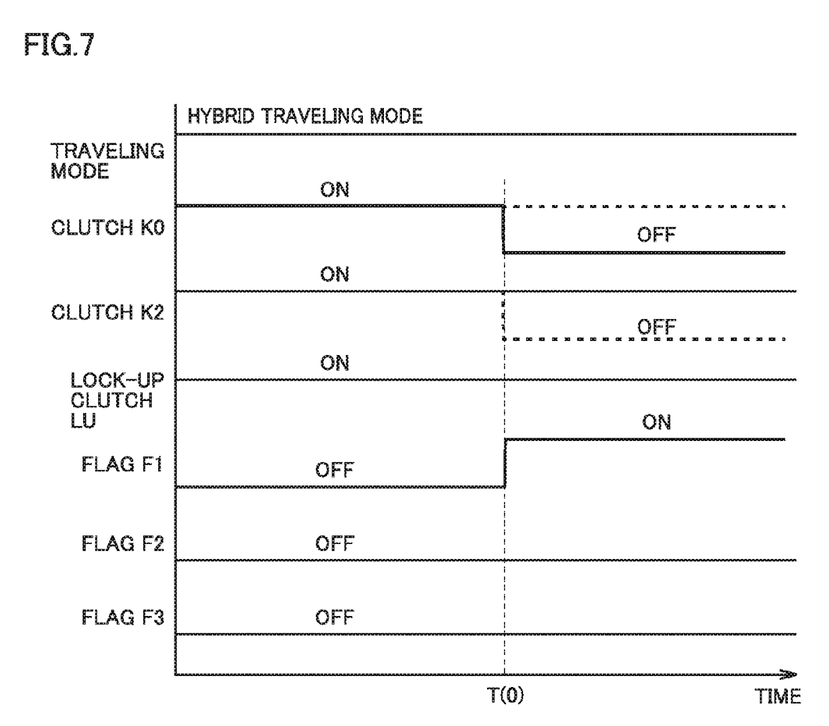
FIG. 7 is a timing chart for illustrating operation of the ECU when the hybrid traveling mode is selected.

For example, as shown in FIG. 7, the case where the traveling mode is the hybrid traveling mode is assumed (YES in S100). The count processing is executed (S104) by extracting amplitudes f1, f2 of the resonant zone (S102) based on engine rotation number Ne and motor rotation number Nm and comparing the same with first amplitude threshold value x1 and second amplitude threshold value x2.

At time T(0), when first count value Nf1 is greater than threshold value n(1), in other words, when it is determined that resonance occurs in first rotational shaft 14A, the first resonance avoidance control is started in accordance with setting flag F1 to be in the on-state (S108). Therefore, a clutch having a smaller change in the driving force due to the release between clutch K0 and clutch K2 is released.

For example, when the MG torque is greater than the engine torque, as indicated by the solid lines in the second stage and the third stage from the upper side in FIG. 7, clutch K0 is released, and the engaged state of clutch K2 is maintained at time T(0). Since the state is changed from the state in which clutch K0 and K2 are engaged to the state in which only clutch K2 is engaged, the resonance characteristic in first rotational shaft 14A is changed. Consequently, the amplitude of the torque fluctuations in the resonant zone is lowered, so that it can suppress great torque given to input shaft 31.

On the other hand, when the engine torque is greater than the MG torque, as indicated by the broken lines in the second stage and the third stage from the upper side in FIG. 7 clutch K2 is released and the engaged state of clutch K0 is maintained at time T(0). Since the state is changed from the state in which clutch K0 and K2 are engaged to the state in which only clutch K0 is engaged, the resonance characteristic in first rotational shaft 14A is changed. Consequently, the amplitude of the torque fluctuations in the resonant zone is lowered, so that it can suppress great torque given to input shaft 31.

When predetermined time period Ta has elapsed after the determination that resonance occurs in first rotational shaft 14A (YES in S110), the first resonance avoidance control is terminated (S122). At this time, all of flag F1, flag F2, and flag F3 are set to be in the off-state.

Figure 8:
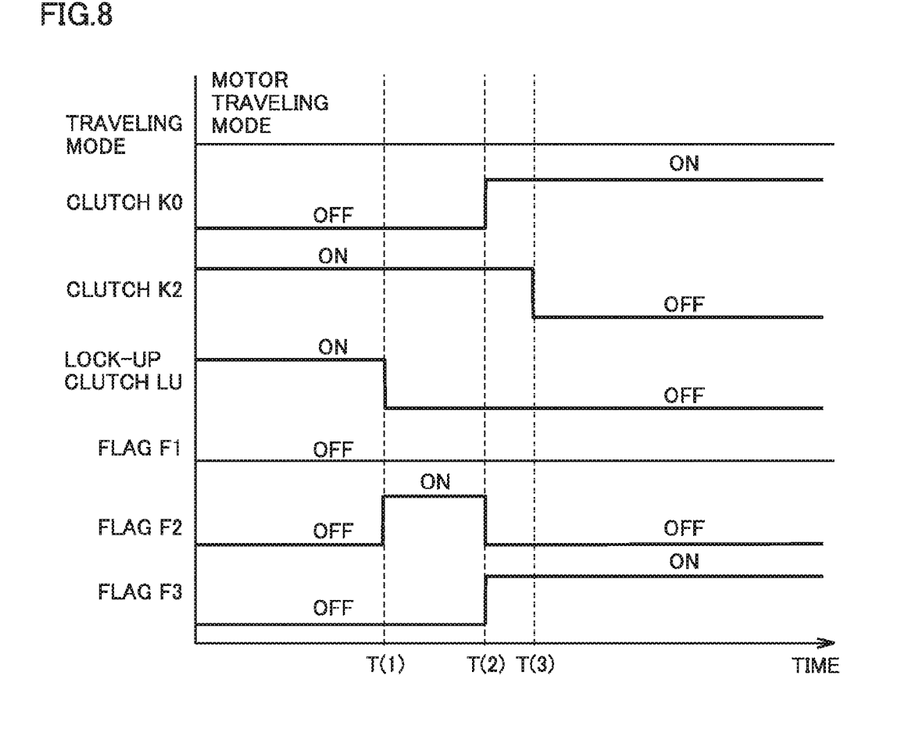
FIG. 8 is a timing chart for illustrating, operation of the ECU when the motor traveling mode is selected.

Next, for example, as shown in FIG. 8, the case where the traveling mode is the motor traveling mode is assumed (YES in S200). The count processing is executed (S204) by extracting amplitude f2 in the resonant zone based on motor rotation number Nm (S202), and comparing the same with second amplitude threshold value x2 (S204).

At time T(1), when second count value Nf2 is greater than threshold value n(2), in other words, when it is determined that resonance occurs in second rotational shaft 14B, the second resonance avoidance control is started in accordance with setting flag F2 to be in the on-state (S208). Therefore, lock-up clutch LU is released.

As shown in the graph in the fourth stage from the upper side in FIG. 8, at time T(2) which is predetermined time Tb elapsed after lock-up clutch LU is controlled to be in the released state at time T(1) (YES in S210), when resonance occurs continuously (YES in S212), flag F2 is set to be in the off-state, and flag F3 is set to be in the on-state. Consequently, clutch K0 is engaged, and the start control of engine 10 is started. At time T(3), clutch K2 is released after starting engine 10 (S214). Since the state is changed from the state in which only clutch K2 is engaged to the state in which only clutch K0 is engaged, the resonance characteristic in second rotational shaft 14B is changed. Consequently, the amplitude of the torque fluctuations in the resonant zone is lowered, so that great torque given to input shaft 31 is suppressed.

When predetermined time period Ta has elapsed after it is determined that resonance occurs in second rotational shaft 14B (YES in S216), the third resonance avoidance control is terminated (S218). At this time, all of flag F1, flag F2, and flag F3 are set to be in the off-state.

As described above, when resonance occurs in first rotational shaft 14A, either clutch K0 or clutch K2 is released, so that the resonance characteristic (resonance frequency) of first rotational shaft 14A can be changed. Therefore, occurrence of resonance in first rotational shaft 14A can be suppressed. Further, when resonance occurs in second rotational shaft 14B, lock-up clutch LU is released, so that the resonance characteristic can be changed, and the torque fluctuations transmitted from driving wheels 35 can be alleviated by torque converter 33. Therefore, occurrence of resonance in second rotational shaft 14B can be suppressed. Thus, a hybrid vehicle suppressing occurrence of resonance in a rotational shaft between a driving source and a transmission can be provided.

Modified examples of the present embodiment will be described. In the present embodiment, it is described that the resonance avoidance control is not executed when the traveling mode is the engine travel mode. However, the resonance avoidance control may be executed also when the engine travel mode is selected. For example, when the engine travel mode is selected, and it is determined that resonance occurs in first rotational shaft 14A, lock-up clutch LU may be released, or clutch K2 may be engaged to release clutch K0.

In the present embodiment, it is described that when the traveling mode is the hybrid traveling mode, and resonance occurs in second rotational shaft 14B, clutch K2 is released if resonance continues after lock-up clutch LU is released, with assumption that lock-up clutch LU is in the engaged state. However, for example, when resonance occurs in second rotational shaft 14B, clutch K2 may be released when lock-up clutch LU is in the released state, or regardless of the state of lock-up clutch LU.

In the present embodiment, it is described that when resonance occurs in second rotational shaft 14B, and the resonance continuously occurs after releasing lock-up clutch LU, clutch K2 is released. In this case, the release of lock-up clutch LU may be continued, or clutch K2 may be released after engaging lock-up clutch LU.

In the present embodiment, it is described that, regardless of the traveling state of vehicle 1, when the traveling triode is either the motor traveling mode or the hybrid traveling mode, the resonance avoidance control is executed if resonance occurs in either first rotational shaft 14A or second rotational shaft 14B. However, a condition as to a speed of vehicle 1 may be added. For example, if the traveling mode is either the motor traveling mode or the hybrid traveling mode during traveling at a speed of vehicle 1 higher than the threshold value, as described above, when resonance occurs in either first rotational shaft 14A or second rotational shaft 14B, ECU 100 may execute the resonance avoidance control in accordance with the resonance-occurring part.

In the present embodiment, it is described that it is determined whether or not resonance occurs in first rotational shaft 14A with use of a detection result of engine rotation number sensor 16, and it is determined whether or not resonance occurs in second rotational shaft 14B with use of a detection result of resolver 24. However, for example, it may be determined whether or not resonance occurs in first rotational shaft 14A with use of a detection result of the rotation number sensor for detecting a rotation number of first rotational shaft 14A, or it may be determined whether or not resonance occurs in second rotational shaft 14B with use of a detection result of a rotation number sensor for detecting a rotation number of second rotational shaft 14B.

In the present embodiment, it is described that ECU 100 terminates the resonance avoidance control when predetermined time period Ta has elapsed from determination of occurrence of resonance. However, for example, after the termination of the resonance avoidance control, the engaged state of clutch K0 and clutch K2 may be changed in accordance with the traveling mode, or the engaged state of lock-up clutch LU may be changed in accordance with a state of a vehicle. Alternatively, also after the termination of the resonance avoidance control, ECU 100 may maintain the gate of clutch K0, clutch K2, and lock-up clutch LU provided at the time of termination of the resonance avoidance control until vehicle 1 stops, until a traveling distance becomes greater than or equal to a predetermined distance or a traveling time becomes greater than or equal to a predetermined time period, and thereafter ECU 100 may change the engaged state of clutch K0, clutch K2, and lock-up clutch LU in accordance with the traveling mode and the state of vehicle.

It should be noted that all or some of the modified examples may be implemented in combination.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
   an engine;
   a first rotational shaft having one end connected to an output shaft of the engine via a first clutch;
   a torque converter including a lock-up clutch and having an output shaft connected to driving wheels via a transmission;
   a second rotational shaft connecting the other end of the first rotational shaft and an input shaft of the torque converter;
   a driving electric motor connected to the second rotational shaft via a second clutch; and
   a control device configured to control operation of the first clutch, the second clutch, and the lock-up clutch,
   the control device releasing either of the first clutch and the second clutch when resonance occurs in the first rotational shaft, and releasing the lock-up clutch when resonance occurs in the second rotational shaft.

2. The hybrid vehicle according to claim 1, wherein the control device releases one of the first clutch and the second clutch that has a smaller change in a driving force transmitted to the driving wheels due to the release, when resonance occurs in the first rotational shaft.

3. The hybrid vehicle according to claim 2, wherein so as to suppress a change in the driving force transmitted to the driving wheels caused by one clutch being in a released state, the control device increases an output of a driving source connected to the other clutch.

4. The hybrid vehicle according to claim 1, wherein during traveling of the vehicle with operation of the engine and the driving electric motor, when the lock-up clutch is released due to occurrence of resonance in the second rotational shaft and when the resonance is not suppressed by the release of the lock-up clutch, the control device releases the second clutch.

5. The hybrid vehicle according to claim 1, wherein during traveling of the vehicle with operation of the driving electric motor in a state where the engine is stopped, when the lock-up clutch is released due to occurrence of resonance in the second rotational shaft and when the resonance is not suppressed by the release of the lock-up clutch, the control device performs engagement of the first clutch, starting of the engine, and releasing of the second clutch.

6. The hybrid vehicle according to claim 4, wherein the control device increases an output of the engine so as to suppress a change in a driving force transmitted to the driving wheels due to the release of the second clutch.

7. The hybrid vehicle according to claim 5, wherein the control device increases an output of the engine so as to suppress a change in a driving force transmitted to the driving wheels due to the release of the second clutch.

* * * * *